United States Patent [19]
Sawada et al.

[11] Patent Number: 4,642,069
[45] Date of Patent: Feb. 10, 1987

[54] HYDRAULIC CONTROL SYSTEM FOR CONTINUOUSLY VARIABLE TRANSMISSION

[75] Inventors: Daisaku Sawada, Gotenba; Masami Sugaya, Susono; Ryuji Imai, Toyota; Yoshinobu Soga, Susono, all of Japan

[73] Assignee: Toyota Jidosha Kabushiki Kaisha, Aichi, Japan

[21] Appl. No.: 782,903

[22] Filed: Oct. 2, 1985

[30] Foreign Application Priority Data

Oct. 4, 1984 [JP] Japan ................... 59-208963

[51] Int. Cl.$^4$ ............................................. F16H 11/04
[52] U.S. Cl. .................................................... 474/28
[58] Field of Search ............... 474/16, 28, 29; 74/687, 74/867

[56] References Cited

U.S. PATENT DOCUMENTS

| | | | |
|---|---|---|---|
| 4,512,751 | 4/1985 | Tanaka et al. | 474/28 |
| 4,551,119 | 11/1985 | Sugaya et al. | 474/28 |
| 4,584,909 | 4/1986 | Abo et al. | 474/28 X |

*Primary Examiner*—James A. Leppink
*Assistant Examiner*—Frank H. McKenzie, Jr.
*Attorney, Agent, or Firm*—Parkhurst & Oliff

[57] ABSTRACT

A hydraulic control system for a continuously variable transmission having a first and a second variable-diameter pulley provided on a first and a second shaft, a transmission belt connecting the first and second pulleys to transmit power from one of the first and second pulleys to the other, and a pair of hydraulic cylinders for changing an effective diameter of the pulleys engaging the belt. The hydraulic control system includes a hydraulic source delivering a pressurized fluid, and a flow control device for controlling a flow of the pressurized fluid from said hydraulic source into one of said hydraulic cylinders, and a flow of the fluid from said one hydraulic cylinder, thereby changing the effective diameters of the pulleys to vary a speed ratio of the transmission. The control system comprises a pressure regulating device for regulating the pressurized fluid which is delivered from the hydraulic source and applied to the flow control device so that a pressure of the pressurized fluid is higher than a pressure in the above-indicated one hydraulic cylinder by a predetermined value.

6 Claims, 9 Drawing Figures

HYDRAULIC CONTROL SYSTEM FOR CONTINUOUSLY VARIABLE TRANSMISSION

BACKGROUND OF THE INVENTION

1. Field of the Invention

The present invention relates generally to a hydraulic control device for a continuously variable transmission of belt-and-pulley type, and more particularly to techniques for minimizing a loss of a drive power which is consumed for delivering a pressurized fluid from a hydraulic source to the transmission.

2. Related Art Statement

Figure 9:
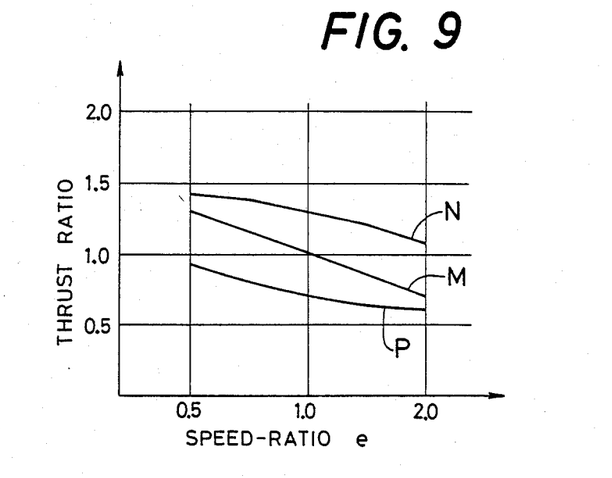
FIG. 9 is a graph illustrating changes in thrust ratio of the continuously variable transmission of FIG. 1, in relation to its speed ratio.

A continuously variable transmission of belt-and-pulley type is known, which comprises a first and a second variable-diameter pulley provided on a first (input) and a second (output) shaft, respectively, a transmission belt connecting the first and second variable-diameter pulleys, and a first and a second hydraulic cylinder to change an effective diameter of the pulleys. In such a continuously variable transmission, a ratio of a thrust of the second hydraulic cylinder (for the output shaft) to that of the first hydraulic cylinder (for the input shaft) must be changed over a relatively wide range, for example, from 1.5 to 0.5, in order to change a speed ratio of the transmission for providing output speeds over a wide range. FIG. 9 shows an example of a relation between the thrust ratio of the transmission and the speed ratio "e", i.e., the thrust ratio which must be changed according to a change in the speed ratio "e". Reference character P indicates the relation between the thrust ratio and the speed ratio "e" when a positive load torque is applied to the transmission, while reference character N indicates the relation when a negative load torque is applied to the transmission. Further, reference character M indicates the relation when no load is applied.

For such type of continuously variable transmission, there is used a hydraulic control system as disclosed, for example, in Japanese Patent Application which was laid open in 1977 under Publication No. 52-98861. Such a hydraulic control system employs a single line pessure common to the first and second hydraulic cylinders. The line pressure is directly supplied to the second of the two cylinders to maintain an optimum tension of the transmission belt. To the first cylinder, the line pressure is supplied through a flow control valve which is assigned to control a flow of the working fluid fed into the first cylinder or a flow of the fluid discharged from the first cylinder to a drain line, for example, in order to control the speed ratio "e" of the transmission. To change the thrust ratio of the first and second hydraulic cylinders over a wide range, the pressure receiving area of said first cylinder which is controlled by the flow control valve must be about twice as large as that of said second cylinder. In this arrangement, the first cylinder must have a large diameter, which leads to an increased overall size of the transmission. Further, the above arrangement causes an increased moment of inertia of the members on the first or input shaft, and requires a large amount of working fluid to change the speed ratio. Accordingly, the known hydraulic control system as described above fails to provide a satisfactory operating response.

An alternative hydraulic control system is known, which uses two line pressures, i.e., first and second line pressures which are controlled by first and second pressure regulating valves, respectively. The first line pressure which is lower than the second line pressure, is used for the previously indicated second of the two hydraulic cylinders primarily for controlling the tension of the transmission belt. The second line pressure is applied to a flow control valve. In this type of hydraulic control system, a pressure difference between the first and second line pressures assures a relatively large difference in thrust between the two cylinders, even if the two cylinders have substantially the same pressure receiving areas. A hydraulic control system of this type is disclosed in Japanese Patent Application which was published in 1973 under Publication No. 48-26692 for opposition purpose.

PROBLEM SOLVED BY THE INVENTION

In the known hydraulic control system for a continuously variable transmission, wherein the first and second line pressures are used as indicated just above, the second line pressure which is higher than the first line pressure is not necessary while the thrust of said first cylinder controlled by the flow control valve is smaller than the thrust of said second cylinder, namely, while the thrust ratio is larger than 1. In this condition, an oil pump is unnecessarily operated to provide the second line pressure. This useless operation of the oil pump causes a power loss and is unfavourable. Further, the second line pressure must be considerably higher than the first line pressure so that the continuously variable transmission may exhibit a good operating response over the entire range of its speed ratio. This means an increased drive torque requirement of the oil pump, and an accordingly increased power loss due to useless activation of the pump in the above-indication condition.

SUMMARY OF THE INVENTION

It is accordingly an object of the present invention to provide an improved hydraulic control system for a continuously variable transmission, which is operable with minimum power consumption, while permitting a satisfactory control of the speed ratio of the transmission over a wide range.

According to the present invention, there is provided a hydraulic control system for a continuously variable transmission having a first and a second variable-diameter pulley provided on a first and a second shaft, a transmission belt connecting the first and second pulleys to transmit power from one of the first and second pulleys to the other, and a pair of hydraulic cylinders for changing an effective diameter of the pulleys engaging the belt, the hydraulic control system including a hydraulic source delivering a pressurized fluid, and a flow control device for controlling a flow of the pressurized fluid from the hydraulic source into one of the hydraulic cylinders, and a flow of the fluid from said one hydraulic cylinder, thereby changing the effective diameters of the pulleys to vary a speed ratio of the transmission, the hydraulic control system comprising:

a pressure regulating device for regulating the pressurized fluid which is delivered from the hydraulic source and applied to said flow control device so that a pressure of the pressurized fluid is higher than a pressure in said one hydraulic cylinder by a predetermined value.

In the hydraulic control system constructed according to the invention as described above, the pressure of the fluid which is supplied from the hydraulic source to the flow control device is regulated by the pressure regulating device, according to a variation in the pressure in said one hydraulic cylinder, that is, to a variation in the speed ratio or transmission torque value of the transmission, so that the pressure applied to the flow control device is higher by the predetermined value than the pressure in said one hydraulic cylinder. As a result, the fluid may be fed into said one hydraulic cylinder through the flow control device, and the two cylinders may be operated over a sufficiently wide range of thrust ratio (at a suitable thrust ratio), irrespective of the current speed ratio of the transmission, even when the two cylinders have substantially the same pressure receiving areas. Further, the pressure regulating device controls the pressurized fluid from the hydraulic source, so that the pressure to be applied to the flow control device is at a minimum level required to provide a necessary thrust ratio of the two hydraulic cylinders. Hence, the instant hydraulic control system may operate the transmission with a minimum power loss.

According to another aspect of the invention, there is provided a hydraulic control system for a continuously variable transmission having a first and a second variable-diameter pulley provided on a first and a second shaft, a transmission belt connecting the first and second pulleys to transmit power from one of the first and second pulleys to the other, and a pair of hydraulic cylinders for changing an effective diameter of the pulleys engaging the belt, the hydraulic control system including (a) a hydraulic source delivering a pressuzied fluid, (b) a first pressure regulating device for regulating the pressurized fluid to apply a first line pressure to one of the hydraulic cylinders for controlling a tension of the transmission belt, and (c) a flow control device for controlling a flow of the fluid into the other hydraulic cylinder and a flow of the fluid from said other hydraulic cylinder, thereby changing the effective diameters of the pulleys to vary a speed ratio of the transmission, the hydraulic control system comprising: a second pressure regulating device provided between the hydraulic source and the first pressure regulating device, and regulating the pressurized fluid to apply a second line pressure to the flow control device, the second line pressure being higher than a pressure in said other hydraulic cylinder by a predetermined value; and a relief valve connected between one of a second pressure line for applying the second line pressure to the flow control device, and a line communicating with said other hydraulic cylinder, and one of a first pressure line for applying the first line pressure to said one hydraulic cylinder, and a drain line for returning the fluid to the hydraulic source.

In the hydraulic control system described above, the second line pressure to be applied to the flow control device is regulated by the second pressure regulating device, so that the second line pressure is higher than the pressure in said other hydraulic cylinder by the predetermined value. Therefore, the same effects as provided in the preceding system of the invention may be obtained in this hydraulic control system.

In addition, the relief valve provided between one of the second pressure line and the line communicating with said other cylinder, and one of the first pressure line and the drain line, acts to prevent an excessive rise in the second line pressure, which may occur, for example, when the transmission is required to provide the maximum speed ratio. If, for example, the flow control device is open so that the hydraulic source and said other hydraulic cylinder communicate with each other after the width of the V-groove of the first variable-diameter pulley has been minimized by a flow of the fluid into said other hydraulic cylinder through the flow control device, the second pressure regulating device would restrict a flow of the fluid from the hydraulic source into the second pressure line in order to establish the previously indicated predetermined pressure differential between the hydraulic source and said other hydraulic cylinder even though this other hydraulic cylinder is full of the fluid. In this condition, the second line pressure would be excessively raised. In this case, however, the pressure relief valve is opened at its preset pressure to release the second line pressure or the pressure in said other hydraulic cylinder, into the first pressure line or drain line which is lower in pressure than the second pressure line or said other hydraulic cylinder. Consequently, the above-indicated operation of the second pressure regulating device will not result in an excessive rise in the second line pressure. Thus, the relief valve serves to eliminate a waste of the power to drive the transmission. Further, the relief valve eliminates an unnecessarily high tension of the transmission belt, thereby improving the durability of the transmission.

The first pressure regulating device is usually controlled in response to a signal from a controller (a computer), which signal is determined so that the first line pressure is held at a minimum level required to establish a desired speed ratio or transmission torque of the transmission without a slip of the transmission belt on the pulleys. In some operating conditions, the first line pressure may be higher than the pressure in said other hydraulic cylinder. In this case, the second pressure regulating device fails to operate to effect the intended pressure control, whereby the second line pressure and the first line pressure are changed with each other. However, as long as the first line pressure is lower than the pressure in said other hydraulic cylinder, the second pressure regulating device operates to control the second line pressure to be higher than the pressure in said other hydraulic cylinder, by a predetermined pressure.

According to an advantageous embodiment of the invention, the second pressure regulating device comprises means for defining cylinder bore, and a valve spool which is slidably received within the cylinder bore and is movable between an open position in which the first and second pressure lines communicate with each other, and a closed position in which the first and second pressure lines are disconnected from each other. The valve spool has a first pressure receiving surface which receives the second line pressure to move the valve spool toward its open position, and a second pressure receiving surface which receives the pressure in said other hydraulic cylinder to move the valve spool toward its closed position. When the second pressure regulating device is constructed as described above, a spring may be provided to bias the valve spool toward the closed position. In this case, the pressure differential (predetermined value) between the second line pressure and the pressure in said other hydraulic cylinder is determined by a difference between a thrust on the first pressure receiving surfaces, and a sum of a thrust on the second pressure receiving surface and a biasing force of the spring.

According to another embodiment of the invention, the hydraulic control system may further comprise a restrictor or throttling valve connected between the relief valve and the line communicating with said other hydraulic cylinder, so that the pressure in said other hydraulic cylinder is applied to the second pressure regulating device via a line connecting the restrictor and the relief valve. In this case, if the second line pressure is released through the relief valve while by-passing the second pressure regulating device, the pressure in said other hydraulic cylinder is applied to the second pressure regulating device via the restrictor, that is, a pressure slightly lower than the pressure in said other cylinder is applied to the second pressure regulating device. Therefore, the second pressure regulating device will not be fully closed, i.e., held open to some extent, whereby the second line pressure may be released also through the second pressure regulating device. Accordingly, the use of the restrictor may reduce the required capacity of the relief valve.

BRIEF DESCRIPTION OF THE DRAWING

The above and other objects, features and advantages of this invention will become more apparent from reading the following detailed description of preferred embodiments of the invention, when considered in conjunction with the accompanying drawing, in which.

DETAILED DESCRIPTION OF THE PREFERRED EMBODIMENTS

To further clarify the concept of the present invention, several preferred embodiments of the invention will be described in detail, by reference to figures of the appended drawing.

Figure 1:
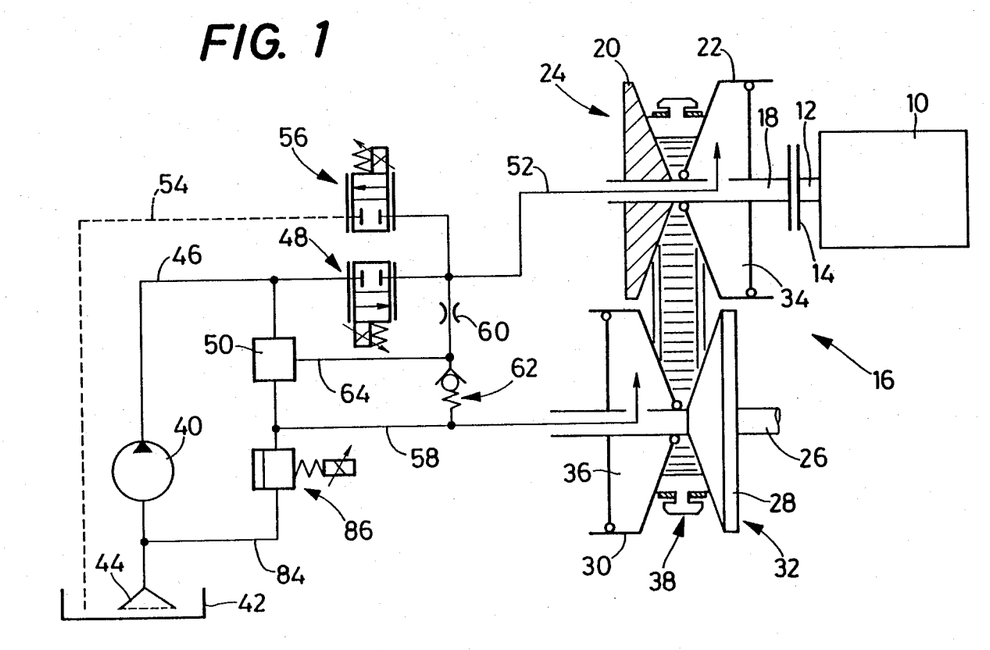
FIG. 1 is a schematic hydraulic circuit diagram of one embodiment of a hydraulic control system of the present invention.

Referring first to FIG. 1, there is shown an engine 10 of an automotive vehicle. The engine 10 has a crank shaft 12 which is connected to a first shaft (input or drive shaft) 18 of a continuously variable transmission 16 of belt-and-pulley type (hereinafter abbreviated as "CVT"), via a clutch 14 such as an electromagnetic or centrifugal clutch, or a fluid coupling. The first shaft 18 is provided with a stationary rotor 20 fixed thereto, and an axially movable rotor 22. The rotor 22 is movable on the first shaft 18 in the axial direction, but not rotatable relative to the first shaft 18. The stationary and movable rotors 20, 22 cooperate to constitute a first variable-diameter pulley 24 having a V-groove whose width is variable. Namely, the variable-diameter pulley 24 is adapted such that its effective diameter engaging a transmission belt 38 (which will be described) is variable. The CVT 16 further has a second shaft (output or driven shaft) 26 has a stationary rotor 28 fixed thereto, and an axially movable rotor 30 similar to the rotor 22. These rotors 28, 30 cooperate to constitute a second variable-diameter pulley 32. The movable rotor 22 of the first variable-diameter pulley 24 is moved axially of the first shaft 18 by a first hydraulic cylinder 34, while the movable rotor 30 of the second variable-diameter pulley 32 is moved axially of the second shaft 26 by a second hydraulic cylinder 36. The first and second hydraulic cylinders 34 and 36 have substantially the same pressure-receiving areas, and the first and second variable-diameter pulleys 24 and 32 have substantially the same diameter. The pulleys 24, 32 are connected by transmission belt 38 which is usually made up of an endless hoop, and a multiplicity of blocks arranged along the hoop. A rotary motion of the engine 10 transmitted to the first shaft 18 is imparted to the second shaft 26 through the transmission belt 38, and then transmitted to drive wheels of the vehicle, via an auxiliary transmission and a final drive unit (final reduction gear), both of which are not shown. As a hydraulic source for the first and second hydraulic cylinders 34, 36, there is provided a pump 40 which is operatively connected to the crank shaft 12 through a connection rod (not shown) which extends through the first shaft 18 of the CVT 16, whereby the pump 40 is driven by the engine 10. The pump 40 pumps up a working fluid from an oil reservoir 42 through a strainer 44, and delivers the pressurized fluid to a flow control servo valve 48 and to a pressure regulating valve 50 through a second pressure line 46. The flow control servo valve 48 is a two-way valve connected to the first hydraulic cylinder 34 through a line 52. The flow control servo valve 48 is designed primarily for controlling a flow of the working fluid from the second pressure line 46 into the first hydraulic cylinder 34. Between the line 52 and a drain conduit 54, there is connected a flow control servo valve 56 similar to the servo valve 48. This second flow control servo valve 56 is designed primarily for controlling a flow of the working fluid from the first hydraulic cylinder 34 into the oil reservoir 42. The two flow control servo valves 48 and 56 are selectively operated in response to signals from a controller (not shown), in order to change the effective diameter of the first variable-diameter pulley 24, whereby a speed ratio "e" of the CVT 16 (speed of the second shaft 26 over that of the first shaft 18) is adjusted. As described in Japanese Patent Application No. 57-40747 filed in 1982, the controller supplies the first and second flow control servo valves 48, 56 with the control signals adapted to establish a speed ratio "e" of the CVT 16 which will cause an actual speed of the engine 10 to coincide with a target speed that is determined based on an amount of operation of an accelerator pedal of the vehicle. In this embodiment, the flow control servo valves 48, 50 constitute a flow control device, and the drain conduit 54 and a return line 84 (which will be described) constitute a drain line.

The pressure regulating valve 50 serves as a second pressure regulating device which controls a flow of the working fluid from the second pressure line 46 into a first pressure line 58, and thereby regulates a second line pressure in the second pressure line 46 so that the second line pressure is higher than a pressure in the first hydraulic cylinder 34 by a predetermined value (pressure differential ΔP1). Described in more detail, a restrictor 60 and a relief valve 62 are connected in series between a line 52 and the first pressure line 58. The fluid pressure in the first hydraulic cylinder 34 is applied to the pressure regulating valve 50 via a line 64 which is connected at its one end to the pressure regulating valve 50 and at its other end to a line between the restrictor 60 and the relief valve 62. Based on this fluid pressure from the first hydraulic cylinder 34, the pressure regulating valve 50 adjusts the second line pressure.

Figure 2:
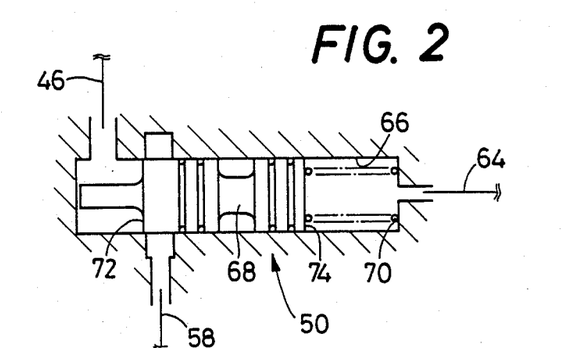
FIG. 2 is a cross sectional view of a pressure control valve used in the embodiment of FIG. 1.

As illustrated in detail in FIG. 2, the pressure regulating valve 50 comprises a valve spool 68 which is axially slidably received in a cylinder bore 66 which communicates with the second pressure line 46, first pressure line 58 and line 64. The valve spool 68 is movable between an open position in which the first and second pressure lines 58 and 46 communicate with each other, and a closed position in which the two pressure lines 58, 46 are disconnected from each other. The valve spool 68 is biased by a spring 70 toward its closed position. That is, the valve 50 is a normally-closed, two-way valve. The valve spool 68 has a first pressure-receiving surface 72 which receives the second line pressure in a direction that will cause the spool 68 to move against a biasing force of the spring 70, i.e., toward the open position. The valve spool 68 further has a second pressure-receiving surface 74 which receives the pressure in the first hydraulic cylinder 34 via the line 64 and thereby moves the spool 68 toward its closed position. With the first and second pressure-receiving surfaces 72 and 74 receiving the respective pressures, the valve spool 68 is located at a position at which a thrust on the first pressure-receiving surface 72 is equal to a sum of a thrust on the second pressure-receiving surface 70 and the biasing force of the spring 70. Thus, an area of communication between the first and second pressure lines 58, 46 is controlled by the pressure regulating valve 50. Stated more specifically, the valve spool 68 is moved to an equilibrium position at which the following equation (1) is satisfied:

$$Pl2 \cdot S1 = Pc \cdot S2 + F(x) \qquad (1)$$

where,
S1: pressure receiving area of the surface 72
S2: pressure receiving area of the surface 74
Pl2: second line pressure in the pressure line 46
Pc: pressure in the first hydraulic cylinder 34
F(x): biasing force of the spring 70
x: displacement of the valve spool 68

As the pressure Pc in the first hydraulic cylinder 34 is lowered, the area of communication between the first and second pressure lines 58, 46 is increased, and the flow of the fluid from the second pressurel line 46 into the first pressure line 58 is increased, whereby the second line pressure Pl2 is lowered. Conversely, as the pressure Pc in the first hydraulic cylinder 34 is raised, the communication area between the first and second pressure lines 58, 46 is reduced, and the second line pressure Pl2 is raised. In this manner, the second line pressure Pl2 is changed following the pressure Pc in the first hydraulic cylinder 34 so that the second line pressure Pl2 is higher than the pressure Pc by the predetermined differential ($\Delta P1 = Pl2 - Pc$). Therefore, the predetermined pressure differential $\Delta P1$ exists across the flow control servo valve 48 even if the speed ratio "e" of the CVT 16 is changed, unless the first line pressure exceeds the second line pressure Pl2. In this specific embodiment, the first and second pressure-receiving areas S1 and S2 are equal, and therefore the pressure differential $\Delta P1$ is determined by $F(x)/S1$ according to the equation (1).

Figure 3:
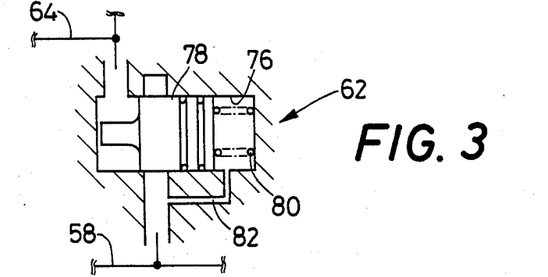
FIG. 3 is a cross sectional view of a relief valve used in the embodiment of FIG. 1.

As shown in detail in FIG. 3, the relief valve 62 has a valve spool 78 slidably received in a cylinder bore 76 which communicates with the first pressure line 58 and the line 64. The valve spool 78 is movable between an open position in which the first pressure line 58 communicates with the line 64, and a closed position in which the first pressure line 58 is disconnected from the line 64. The spool 78 is biased by a spring 80 toward its closed position. The pressure in the line 64 acts on one end surface of the spool 78, while the first line pressure acts on the other end surface of the spool 78 through a line 82. When the valve spool 78 is moved by the pressure in the line 64 against a biasing force of the spring 80 and the first line pressure 64, the line 64 is put into communication with the first pressure line 58, whereby the fluid is permitted to flow from the line 64 into the first pressure line 58. As a result, the valve spool 78 prevents a rise in the pressure in the line 64, i.e., a rise in the pressure in the line 52 and in the second pressure line 46.

In the return line 84 connecting the first pressure line 58 and the suction side of the pump 40, there is provided a first pressure regulating device in the form of a solenoid-operated pressure control servo valve 86 which is designed to control a flow of the fluid from the first pressure line 58 into the return line 84, and thereby regulate the pressure in the first pressure line 58. As disclosed, for example, in Japanese Patent Application No. 57-071467 (filed in 1982), the pressure control servo valve 86 is controlled by a controller (not shown) which produces a control signal determined based on the current speed ratio "e" and transmission torque of the CVT 16, so that the first line pressure in the line 58 is controlled at a permissible lowest level which does not allow the transmission belt 38 to slip on the pulleys 24, 32.

The operation of the present hydraulic control system will be described referring to FIG. 4. As shown in the figure, the first line pressure Pl1 is changed by the pressure control servo valve 86 which is operated in response to a change in the speed ration "e" of the CVT 16. Thus, a force of the second variable-diameter pulley 32 with which the transmission belt 38 is gripped or squeezed, is controlled so as to give the transmission belt 38 a necessary and sufficient tension. In response to the current tension of the transmission belt 38, a pressure Pc in the first hydraulic cylinder 34 is changed corresponding to the tension of the belt 38, the speed ratio "e" and transmission torque of the CVT 16, etc. This pressure Pc is applied to the pressure regulating valve 50 through the line 52, restrictor 60 (throttling valve) and line 64, as previously indicated. As the pressure Pc in the first hydraulic cylinder 34 is lowered, the pressure regulating valve 50 operates to increase a flow of the fluid from the second pressure line 46 into the first pressure line 58. Conversely, the pressure regulating valve 50 operates to reduce the fluid flow from the second pressure line 46 into the first pressure line 58, as the pressure Pc is raised. In this manner, a predetermined pressure differential $\Delta P1$ is maintained between the second line pressure Pl2 and the pressure Pc in the first hydraulic cylinder 34. As a result, the pressure regulating valve 50 serves to maintain the pressure differential $\Delta P1$ across the flow control servo valve 48. The regulation of the second line pressure Pl2 in this way will give the CVT 16 a suitable thrust ratio of the first and second hydraulic cylinders 34, 36, over a wide range of the speed ratio "e", even with the first and second hydraulic cylinders 34, 36 having substantially the same pressure receiving areas. In other words, the speed ratio "e" of the CVT may be controlled or varied over a comparatively wide range.

Figure 4:
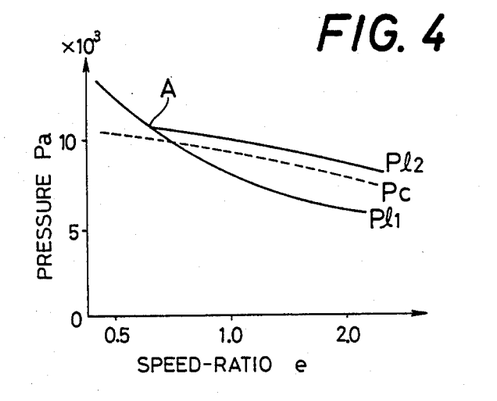
FIG. 4 is a graphical representation of the operation of the embodiment of FIG. 1, showing changes in pressure at different points in the circuit, in relation to a speed ratio of a continuously variable transmission.

As is apparent from the above description, the second line pressure Pl2, i.e., the output pressure of the pump 40 is controlled by the pressure regulating device 50 to be higher than the pressure Pc in the first hydraulic cylinder 34 by the predetermined value ($\Delta$P1), as indicated in FIG. 4. That is, the output pressure of the pump 40 is maintained at a required minimum level corresponding to the current speed ratio "e" of the CVT 16. Therefore, a power loss of the engine 10 due to activation of the pump 40 is minimized, and consequently the fuel economy of the vehicle is maximized. In this connection, it is noted that the power loss of the engine 10 is excessive when the pressure differential $\Delta$P1 exceeds an upper limit, while the CVT 16 fails to obtain a sufficient difference in thrust between the first and second hydraulic cylinders 34, 36 if the pressure differential $\Delta$P1 is smaller than a lower limit. Based on experiments conducted by the inventors, it is preferred to maintain the pressure difference $\Delta$P1 within a range of 0.1-0.5 (MPa), and to determine the biasing force of the spring 70 and/or the pressure receiving areas of the valve spool 68 so that the pressure differential $\Delta$P1 is held within the above-specified range.

When the speed ratio "e" of the CVT 16 is smaller than 1, the first line pressure Pl1 may possibly exceeds the pressure Pc in the first hydraulic cylinder 34 or the second line pressure Pl2. This may happen, for example, when the speed ratio "e" becomes smaller than a point A indicated in FIG. 4. In this event, in spite of the operation of the pressure regulating valve 50 to establish the pressure differential $\Delta$P1 across the flow control servo valve 48, the first line pressure Pl1 in the first pressure line 58 downstream of the valve 50 becomes equal to or higher than the second line pressure Pl2 in the second pressure line 46 upstream of the valve 50. Nevertheless, the pressure Pc in the first hydraulic cylinder 34 will not be raised with the first line pressure Pl1, as indicated in FIG. 4, since the pressure Pc is determined by the tension of the transmission belt 38, the speed ratio "e" and transmission torque of the CVT 16, etc.

If, on the other hand, the flow control servo valve 48 is operated so as to permit a large amount of flow of the fluid from the second pressure line 46 into the first hydraulic cylinder 34, the movable rotor 22 of the first variable-diameter pulley 24 is moved its full stroke and the speed ratio "e" of the CVT 16 is maximized. In this condition, the flow control servo valve 48 is kept open and consequently the pressure differential $\Delta$P1 between the second line pressure Pl2 and the pressure in the line 52 is zeroed. The pressure regulating valve 50 operates to reduce the area of communication between the second pressure line 46 and the first pressure line 58, in order to establish a pressure differential across the flow control servo valve 48. As a result, there arises a tendency for the second line pressure Pl2 to rise abruptly. However, the rise in the second line pressure Pl2 in the line 46 will cause the relief valve 62 to be open, permitting the fluid to flow from the second pressure line 46 to the first pessure line 58 via the restrictor 60 and the relief valve 62. Thus, the relief valve 62 serves to prevent an excessive rise in the second pressure line 46, thus avoiding a power loss of the engine 10. At this time, the fluid in the line 52 flows to the pressure regulating valve 50 after its pressure is lowered by the restrictor 60. The pressure regulating valve 50 is responsive to a pressure differential caused by the pressure drop by the restrictor 60, as if this pressure differential is the pressure differential $\Delta$P1 existing between the second pressure line 46 and the line 52. As a result, the pressure regulating valve 50 opeates so that the area of communication between the first and second pressure lines 46, 58 corresponds to the pressure drop caused by the restrictor 60. Consequently, the fluid in the second pressure line 46 is released into the first pressure line 58 also through the pressure regulating valve 50. This arrangement provides an advantage that the required capacity of the relief valve 62 may be reduced. It is desired that the operating pressure of the relief valve 62 is selected at a level which is slightly higher than a maximum value of a pressure differential (Pl2−Pl1) between the second and first pressure lines 46, 58.

In the case where the CVT 16 is normally operated at a speed ratio "e" around 2.0, it is recommended that the pressure receiving area of the first hydraulic cylinder 34 be greater than that of the second hydraulic cylinder 36, by a suitable percent, for example, 20%, in order to lower the second line pressure Pl2 and the pressure Pc in the first hydraulic cylinder 34. In this case, the second line pressure Pl2 in the normal range of speed ratio "e" may be held relatively low and the power loss of the engine 10 may be reduced. However, when it is desired to improve a response of the CVT 16 by minimizing the moment of inertia of the first variable-diameter pulley 24, or to reduce the size of the CVT 16, it is preferred that the point A in FIG. 4 corresponds to the speed ratio "e" of 0.5. While the pressure receiving areas of the first and second hydraulic cylinders 34, 36 may be suitably determined with respect to each other, it is desired in the present embodiment that the ratio of the pressure receiving area of the first hydraulic cylinder 34 to that of the second hydraulic cylinder 36 be held within a range of 0.7-1.5.

Referring to FIGS. 5-8, further embodiments of a hydraulic control system of the invention will be described. The same reference numberals as used in the preceding figures are used in FIGS. 5-8 to identify the corresponding elements. In the interest of brevity and simplification, repeated description of these elements will not be provided.

Figure 5:
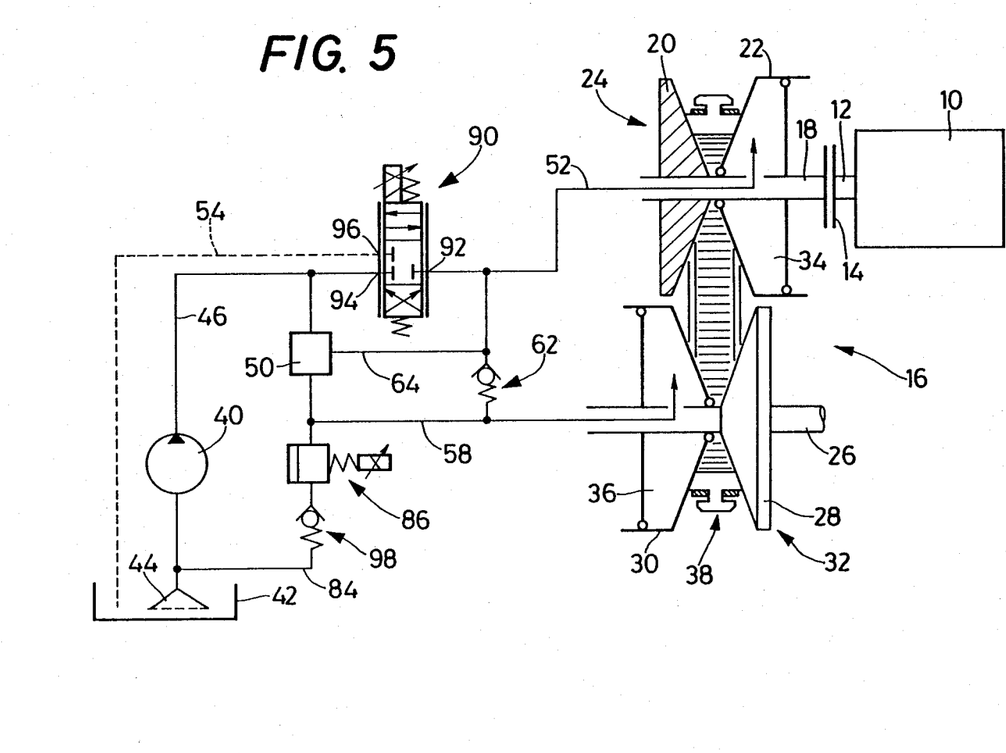
FIG. 5 is a view corresponding to FIG. 1, showing another embodiment of the invention.

A modified embodiment of FIG. 5 uses a flow control servo valve 90 which replaces the pair of flow control servo valves 48, 56 used in the preceding embodiment. The flow control servo valve 90 is a three-way valve having a common port 92, a first port 94 and a second port 96. In operation, the common port 92 is selectively communicated with the first or second port 94, 96, with a controlled area of communication therebetween. The common port 92 is connected to the line 52, while the first and second ports 94, 96 are connected to second pressure line 46 and the drain conduit 54, respectively. While the present embodiment does not use a restrictor like the restrictor 60 used in the preceding embodiment, the same effect as provided in the preceding embodiment may be offered in this embodiment since the pressure Pc in the first hydraulic cylinder 34 is applied to the pressure regulating valve 50 as long as the relief valve 62 is closed, irrespective of whether a restrictor is provided or not. When the movable rotor 22 of the first variable-diameter pulley 24 is moved its full stroke to minimize the width of the V-groove of the pulley 24 and establish the maximum speed ratio "e" of 2.0, the relief valve 62 is opened to prevent an unfavourable rise in the second line pressure in the second pressure line 46, as in the preceding embodiment. Since a restrictor is not provided between the first hydraulic cylinder 34 and the relief valve 62, the pressure Pc in the first hydraulic cylinder 34 is directly applied to the pressure regulating valve 50, and then, the regulating valve 50 is fully closed to disconnect the communication between the second and first pressure lines 46, 58, in order to establish the pressure differential ΔP1 across the flow control servo valve 90. Even in this case, the relief valve 62 may prevent a rise in the second line pressure in the second pressure line 46 and a consequent power loss of the engine 10, if the relief valve 62 has a sufficient capacity. In the present embodiment of FIG. 5, another relief valve 98 is provided downstream of the pressure control servo valve 86. This relief valve 98 serves to set a pressure of the fluid which is used for lubricating various members (not shown). The lubricating fluid is delivered to these members through a conduit connected between the pressure control servo valve 86 and the relief valve 98. Therefore, it will be understood that the principle of the invention may be practiced without the provision of this relief valve 98.

Figure 6:
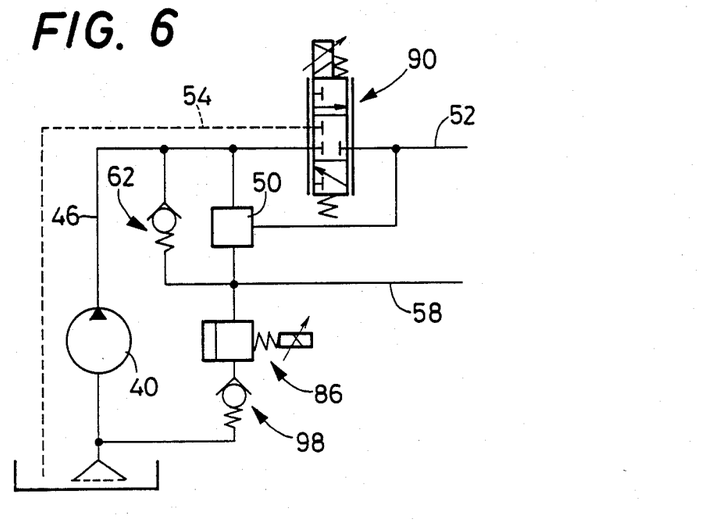
FIGS. 6 and 7 are fragmentary views of further embodiments of the invention.
Figure 7:
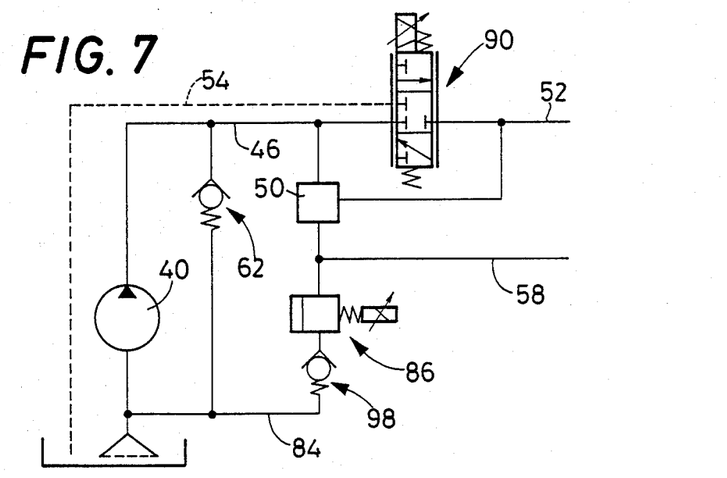

The relief valve 62 may be provided between the second pressure line 46 and the first pressure line 58, as shown in FIG. 6, or between the second pressure line 46 and the return line 84, as shown in FIG. 7. In such cases, the operating pressure of the relief valve 62 is determined to be slightly higher than a maximum difference between the second and first line pressures Pl2 and Pl1, or between the second line pressure Pl2 and the pressure in the return line 84 (substantially equal to the atmospheric pressure). With the operating pressure of the relief valve 62 thus determined, it is possible to prevent the second line pressure Pl2 from rising beyond the operating pressure of the relief valve 62 even when the movble rotor 22 of the first variable-diameter pulley 24 is moved its full stroke to minimize the width of the V-groove of the pulley 24, whereby a consequent power loss of the engine 10 is avoided.

Figure 8:
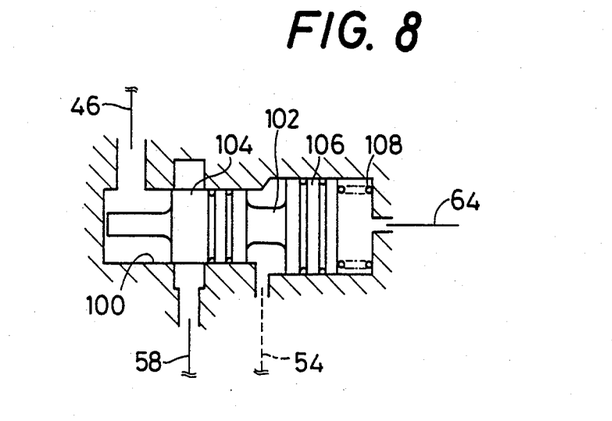
FIG. 8 is a view corresponding to FIG. 2, showing a still further embodiment of the invention.

The pressure regulating valve 50 of FIG. 2 may be modified as illustrated in FIG. 8. This modified regulating valve of FIG. 8 has a valve spool 102 slidably received in a cylinder bore 100 which has a large-diameter portion connected to the line 64. The valve spool 102 has a small-diameter portion 104, and a large-diameter portion 106 corresponding to the large-diameter portion of the cylinder bore 100. The spool 102 is biased toward its closed position by a spring 108 which acts on the large-diameter portion 106. The small-diameter portion 104 and the large-diameter portion 106 are spaced from each other so as to cooperate to define therebetween an annular space which communicates with the drain conduit 54 and which is exposed substantially to the atmospheric pressure. Since the valve spool 102 is operated according to the equation (1) previously indicated, the spring 108 is given a biasing force which is smaller than that of the spring 70 of the embodiment of FIG. 2, by an amount corresponding to a difference in pressure receiving area between the small-diameter and large-diameter portions 104, 106. Namely, the spring 108 may be eliminated if the difference in the pressure receiving area is sufficiently large. In this case, the pressure differential ΔP1 is determined solely by the difference in the pressure receiving area between the two portions 104, 106.

While the present invention has been described in its preferred embodiments, it is to be understood that the invention is not confined to the precise disclosure of the preferred embodiments, but may be otherwise embodied.

For example, the pressure control servo valve 86 provided downstream of the pressure regulating valve 50 to control a flow of the fluid from the valve 50 and thereby regulate the first line pressure Pl1, may be directly connected to the second pressure line 46 via a suitable restrictor to regulate a flow of the fluid from the restrictor.

In the illustrated embodiments, the flow control servo valves 48 and 56, and 90 are provided to control fluid flows to and from the first hydraulic cylinder 34 for changing the effective diameter of the first variable-diameter pulley 24. However, it is possible to use these flow control servo valves for controlling the second hydraulic cylinder 36 and use the pressure control servo valve 86 for controlling the first line pressure to operate the first hydraulic cylinder 34.

While the flow control servo valves 48, 56, 90 and the pressure control servo valve 86 used in the illustrated embodiments are all solenoid-operated, it is possible to use flow control and pressure regulating valves which are operated through mechanical links, or which are turned on and off according to a predetermined duty cycle, as described in Japanese Patent Application which was published in 1983 under Publication No. 58-18547 for opposition purpose.

It will be obvious that other changes, modifications and improvements may be made in the invention without departing from the spirit and scope of the invention defined in the appended claims.

What is claimed is:

1. A hydraulic control system for a continuously variable transmission having a first and a second variable-diameter pulley provided on a first and a second shaft, a transmission belt connecting the first and second pulleys to transmit power from one of the first and second pulleys to the other, and a pair of hydraulic cylinders for changing an effective diameter of the pulleys engaging the belt, the hydraulic control system including a hydraulic source deliverying a pressurized fluid, and a flow control device for controlling a flow of the pressurized fluid from said hydraulic source into one of said hydraulic cylinders, and a flow of the fluid from said one hydraulic cylinder, thereby changing the effective diameters of the pulleys to vary a speed ratio of the transmission, said hydraulic control system comprising:

a pressure regulating device for regulating said pressurized fluid which is delivered from said hydraulic source and applied to said flow control device so that a pressure of said pressurized fluid is higher than a pressure in said one hydraulic cylinder by a predetermined value.

2. A hydraulic control system for a continuously variable transmission having a first and a second variable-diameter pulley provided on a first and a second shaft, a transmission belt connecting the first and second pulleys to transmit power from one of the first and second pulleys to the other, and a pair of hydraulic cylinders for changing an effective diameter of the pulleys engaging the belt, the hydraulic control system including (a) a hydraulic source delivering a pressuzied fluid, (b) a first pressure regulating device for regulating the pressurized fluid to apply a first line pressure to one of said hydraulic cylinders for controlling a tension of the transmission belt, and (c) a flow control device for controlling a flow of the fluid into the other hydraulic cylinder and a flow of the fluid from said other hydraulic cylinder, thereby changing the effective diameters of the pulleys to vary a speed ratio of the transmission, said hydraulic control system comprising:

a second pressure regulating device provided between said hydraulic source and said first pressure regulating device, and regulating said pressurized fluid to apply a second line pressure to said flow control device, said second line pressure being higher than a pressure in said other hydraulic cylinder by a predetermined value; and a relief valve connected between one of a second pressure line for applying said second line pressure to said flow control device, and a line communicating with said other hydraulic cylinder, and one of a first pressure line for applying said first line pressure to said one hydraulic cylinder, and a drain line for returning the fluid to said hydraulic source.

3. A hydraulic control device according to claim 2, wherein said second pressure regulating device is operated to regulate said second line pressure when the first line pressure becomes lower than the pressure in said other hydraulic cylinder.

4. A hydraulic control device according to claim 2, wherein said second pressure regulating device comprises means for defining a cylinder bore, and a valve spool which is slidably received within said bore and is movable between an open position in which said first and second pressure lines communicate with each other, and a closed position in which said first and second pressure lines are disconnected from each other, said valve spool having a first pressure receiving surface which receives said second line pressure to move the valve spool toward its open position, and a second pressure receiving surface which receives the pressure in said other hydraulic cylinder to move the valve spool toward its closed position.

5. A hydraulic control system according to claim 4, wherein said second pressure regulating device further comprises a spring for biasing said valve spool toward said closed position.

6. A hydraulic control system according to claim 2, further comprising a restrictor connected between said relief valve and said line communicating with said other hydraulic cylinder, the pressure in said other hydraulic cylinder being applied to said second pressure regulating device via a line connecting said restrictor and said relief valve.

* * * * *